LOOP ANTENNA

Filed Feb. 28, 1951

INVENTOR.
JOSEPH C. SPINDLER
BY Francis W. Crotty
HIS ATTORNEY

UNITED STATES PATENT OFFICE 2,649,545

LOOP ANTENNA

Joseph C. Spindler, Chicago, Ill., assignor to Zenith Radio Corporation, a corporation of Illinois Application February 28, 1951, Serial No. 213,082

9 Claims. (Cl. 250—33.67)

This invention relates to a novel loop antenna operable over high and low bands of frequencies spaced from one another in the frequency spectrum. The term "radiating conductor" as used herein is intended to denote a receiving as well as a transmitting element because of the completely reciprocal functions of receiving and transmitting antennas.

As presently standardized by the Federal Communications Commission, those portions of the frequency spectrum which are assigned to television service lie in the ranges from 54 to 88 mcs. and from 174 to 217 mcs. Receivers, adapted to reproduce television signals, employ some form of antenna to intercept signals within these ranges. In general, the efficiency of an antenna is related to its effective electrical length and hence, the construction of an antenna which is efficient over each of the two ranges of television frequencies presents a problem of no small proportions, particularly since the two ranges are not harmonically related to one another.

In applications where the antenna size is limited, one solution to this problem is to utilize an arrangement of adjustable physical length for tuning. Other systems provide different tuning means for the antenna, such as an adjustable loading capacitor. In both these arrangements an adjustment is required as the receiver is tuned from channel to channel. This imposes an added duty upon the user which generally is objectionable.

It has been found that for certain localities within the service area of a group of television stations, usually centrally located in the various cities, there exists sufficient signal strength to make the use of indoor antennas feasible. Accordingly, efforts have meen made to include the antenna within the television receiver cabinet but placing the antenna within the confines of the cabinet introduces new problems. For instance, the available space is limited and, in fact, is considerably smaller than that occupied by most outdoor antenna systems. Further, substantially omnidirectivity becomes a necessary feature since, if the antenna has a fixed physical relation with the cabinet proper as is usually the case, it is impractical to shift the receiver to obtain optimum signal response.

It is an object of this invention, therefore, to provide an improved antenna which is efficiently operable over two distinct bands in the frequency spectrum and which may, if desired, be integrated into the cabinet of a television receiver.

Still another object of the invention is the provision of a novel dual-band antenna which requires no adjustable elements or other tuning means and yet operates efficiently over each of its operating bands.

A further object of the invention is to provide an improved dual-band antenna which is substantially omnidirectional at all frequencies within its operating range.

In accordance with the invention, a loop antenna operable over a high and a low band of frequencies spaced from one another in the frequency spectrum comprises a first radiating conductor having an effective electrical length substantially equal to two wavelengths at the center frequency of the high band and bent to provide loop sections in angularly disposed intersecting planes for operation in the high band. That conductor presents terminal ends for connection to a feeder. A second radiating conductor connects opposed portions of the first conductor and extends along the intersection of the aforesaid planes to define with the first conductor another loop including the aforesaid terminal ends for operation in the low band. The antenna further includes a stub line connected to the second conductor and of such electrical length as to constitute therewith at operating frequencies within the high band a high impedance compared with the portion of the first conductor shunted thereby.

The features of the present invention which are believed to be novel are set forth with particularity in the appended claims. The present invention itself, both as to its organization and manner of operation, together with further objects and advantages thereof may best be understood by reference to the following description taken in connection with the accompanying drawings in which:

Figures 1, 2, 3, 4, 5, 6, 7, 8:
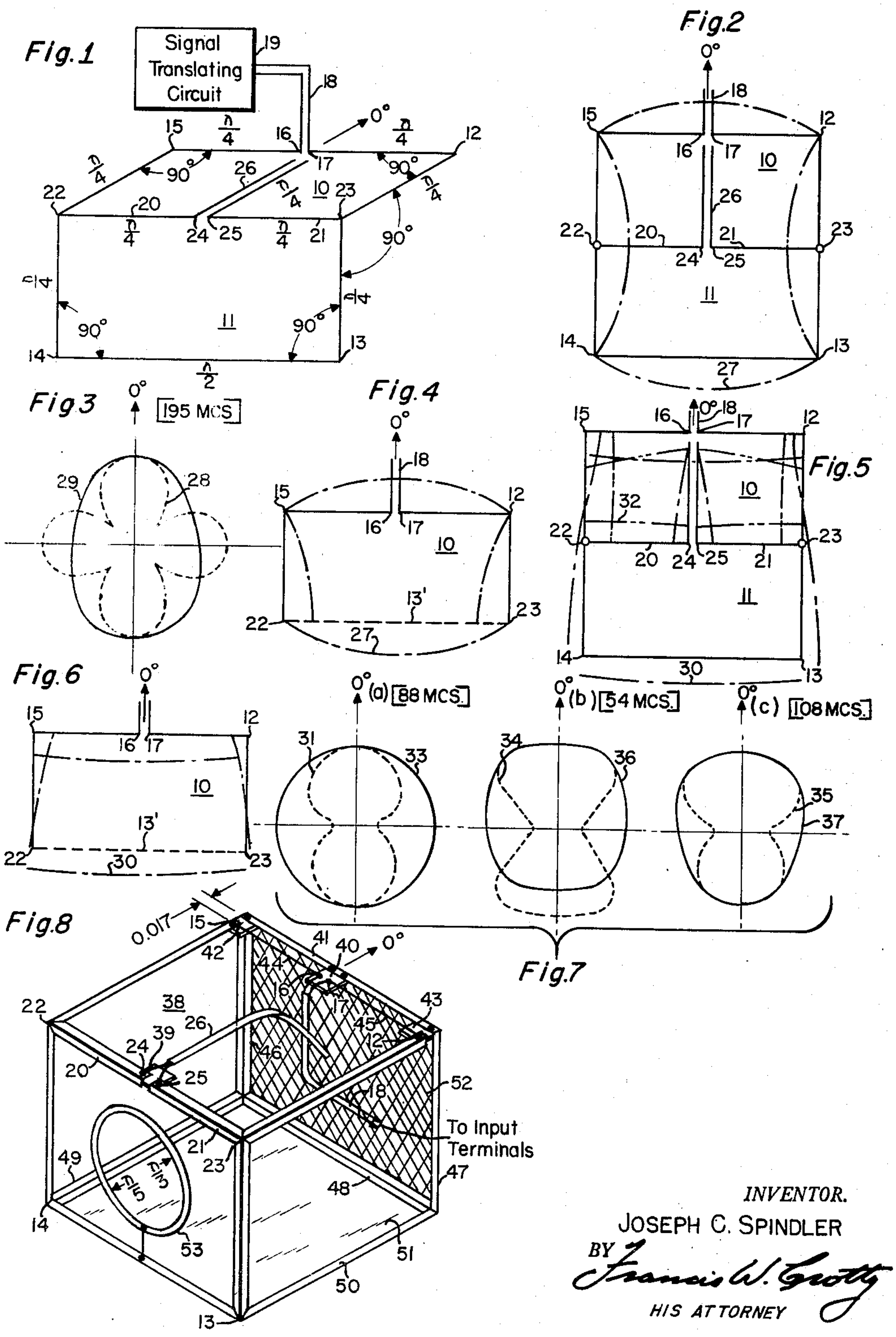
Fig. 1 is an oblique view of an antenna structure in accordance with the invention.
Figs. 2, 4, 5 and 6 are various representations of the antenna shown in Fig. 1 employed to determine current distribution therein.
Figs. 3 and 7 illustrate by polar diagrams, a horizontal cross section of the several field patterns of the antenna structure at certain operating frequencies; and, Fig. 8 is an oblique view of a cabinet frame for a television receiver which comprises an antenna structure in accordance with the invention.

In Fig. 1, the loop antenna operable over a high and a low band of frequencies spaced from one another in the frequency spectrum is designated by the reference numerals 10 and 11 which indicate individual sections thereof. The antenna structure is comprised of a first radiating conductor designated 12, 13, 14 and 15 having an effective electrical length substantially equal to two wavelengths at the center frequency of the high band. The radiator has a 90 degree bend at the center of each of its sections 12—13 and 14—15 so that the antenna sections 10 and 11 are in transversely disposed intersecting planes. More specifically, the plane of section 10 is horizontal while the plane of section 11 is vertical. Preferably, the conductor sections 12—13, 13—14, 14—15 and 15—12 are of equal length, being substantially equal to one-half wavelength at the center frequency of the high band. It is also convenient to have contiguous sections of the conductor disposed at right angles as illustrated.

Conductor section 12—15 is open or discontinuous at its central portion to present terminal ends 16 and 17 for connection to one end of a parallel-wire feeder 18, the other end of which is connected to a signal-translating circuit 19 which is a transmitter or a receiver, depending on the particular installation. Generally speaking, feeder line 18 may be of any suitable length since the mismatch between the line and antenna 10, 11 may be very small over the operating frequency ranges. However, in order to correct for any matching deficiencies at certain frequencies, the length of line 18 may be suitably adjusted and/or a matching section may be utilized in known fashion.

Another conductor having sections 20 and 21 of equal length, disposed with ends adjacent along the intersection of the planes of antenna sections 10 and 11, constitutes a second radiating element connected to opposed mid-portions 22 and 23 of conductor sections 12—13 and 14—15 of the principal radiating element. Conductor 20, 21 has an effective electrical length of one-half wavelength at the center frequency of the high band and causes antenna section 10 to be a closed loop for operation in the low band.

A parallel-wire open-circuited stub line 26 is connected to the adjacent terminal ends 24 and 25 of conductor sections 20 and 21. Line 26 extends from conductor 20, 21 preferably, but not necessarily in the plane of loop section 10 and is of such electrical length as to constitute with conductor 20, 21 at operating frequencies within the high band a high impedance compared with loop section 11 that is shunted thereby. Specifically, the effective electrical length of stub line 26 is substantially equal to one-quarter wavelength at the center frequency of the high band. Therefore, the principal radiator 12—13—14—15 may function efficiently as an effectively closed loop over the high band and the components 20, 21 and 26 which are introduced primarily for efficient operation in the low band do not adversely affect the high-band loop operation.

When stub line 26 is apportioned as described relative to the center frequency of the high band of frequencies assigned to television services, it inherently has a desirable effective electrical length for operation of the antenna structure in a low-frequency band which includes the low frequency television channels and the present-day frequency modulation broadcast band, extending from 54 to 108 mcs. In particular, stub line 26 is apportioned with respect to 195 mcs. which is the center frequency of the high television band. At the same time, the effective length of stub line 26 plus conductor section 20 or 21 is within the range from one-eighth to three-eighths of any wavelength in the defined low-frequency band and this relation assures satisfactory performance throughout the low-frequency band.

For convenience of explanation, the antenna of Fig. 1 will be treated as if utilized for radiating signals. This is a proper expedient inasmuch as the electrical characteristics of an antenna are the same for transmitting as well as for receiving signals. In each of the polar diagrams to be discussed, zero degrees represents an antenna orientation designated by the arrow 0.

In considering the operation of antenna 10, 11 let it be assumed that translator 19 supplies signals at the center frequency of the high band through feeder 18 to terminals 16, 17. Moreover, it will be assumed initially that the antenna sections 10 and 11 are disposed in a single plane as shown in Fig. 2. For the assumed conditions, the current distribution along the loop is represented by the dash-dot curve 27. Since conductor 20, 21 and stub line 26 represents a high impedance across points 22 and 23 of the principal radiator 12—15 substantially no current flows therethrough and their effect on the loop operation may be neglected for frequencies in the high band. The field pattern for a uni-planar loop, such as shown in Fig. 2, is of "clover leaf" form represented by the curve 28 of Fig. 3, exhibiting deep nulls. It is not characterized as omnidirectional. However, an essentially omnidirectional pattern is achieved in accordance with the invention through the use of a radiating conductor of the configuration and length described above.

Inasmuch as sections 14—22 and 13—23 of the principal radiator 12—15 are disposed in a plane perpendicular to the plane of loop 10, they have substantially no effect upon the field pattern of the antenna structure in the plane of loop 10. Further, insofar as the radiation pattern in the plane of loop 10 is concerned, conductor section 13—14 may be considered as being included in the plane of the loop, as represented by conductor 13' in Fig. 4, in which the current distribution determining the radiation pattern of the loop is represented. The resulting field pattern in the plane of loop 10 is shown by curve 29 of Fig. 3 and is essentially omnidirectional. The field pattern for frequencies on either side of the center frequency of the high band may vary slightly although it remains substantially omnidirectional over the entire high band.

In explaining radiation properties of the antenna in the low band, consideration will be given initially to its operation at some intermediate frequency, such as 88 mcs. The significant current distribution for this case is illustrated in Fig. 5. It may be generally stated that a pair of loops contribute to and determine the performance of the antenna structure at frequencies in the low band, one of these being the principal radiating loop conductor 12—15 and the other being loop 10 alone. The current distribution for the larger loop is represented by the dash-dot curve 30 and the portion thereof which contributes to the field pattern in the plane of loop 10 is illustrated in Fig. 6. Its contribution to the field pattern is shown by curve 31 of Fig. 7*a* and is in the nature of a "figure eight" having moderate nulls along a line transverse to the line of zero orientation. Such a pattern, although having utility in many applications, is not entirely omnidirectional in the sense required for a television cabinet antenna.

With reference again to Fig. 5, the current distribution for the small loop is indicated by the dash-dot-dot curve 32. The vector combination of this current distribution with that of curve 30 produces a net or resulting field pattern at 88 mcs. as illustrated by curve 33 of Fig. 7*a*. It is apparent, therefore, that the antenna is omnidirectional at that frequency.

Similar current analyses of Figs. 5 and 6 at the frequencies of 54 and 108 mcs. of the low band, show field patterns for the large loop in the plane of loop 10 as illustrated by curve 34 of Fig. 7*b* and curve 35 of Fig. 7*c*, respectively. However, the vector combination of the field contributions of the large and small loops produces effective field patterns illustrated by curves 36 and 37 of Figs. 7*b* and 7*c*. These patterns demonstrate that the antenna of this invention is substantially omnidirectional in the plane of loop 10 at the low and high extremities of the low operating band.

It follows then that the invention affords a dual-band wide-range antenna which is efficiently operable over two ranges in the frequency spectrum. Furthermore, the antenna has no adjustable elements and there is no need for tuning means to provide efficient operation in each of the ranges. Also, the antenna is substantially omnidirectional at all frequencies within its operating frequency ranges.

Although the illustrated embodiment of the invention employs two loop sections of rectangular configuration, it is to be understood that other configurations are useful. For example, the principal radiating conductor may be shaped to provide semi-circular or semi-elliptical loop sections in angularly disposed, intersecting planes.

In Fig. 8 there is shown a rectangular cabinet frame 38 comprising an antenna structure in accordance with the instant invention. The frame is constructed of twelve conductive, elongated members of L-shaped cross section and those members which correspond to elements of the antenna structure of Fig. 1 are identified by the same reference numerals. It is to be noted that in this case the conductor section 12—15 is composed of two wire or strip conductors 44 and 45, whereas the other sections of the principal radiator 12—15 and conductors 20—21 are incorporated into and constitute part of the cabinet frame. The adjacent ends of conductors 20 and 21 are joined by a block 39 of electrically insulating material and another block of electrically insulating material 40 is affixed to the central portion of an upper and rearwardly disposed frame member 41. The ends of member 41 are mechanically connected to frame members 15—22 and 12—23 by individual insulator blocks 42 and 43. Block 40 provides individual tie points for terminals 16 and 17. Frame member 41 is spaced from conductor 44—45 by a distance approximately equal to 0.01 wavelength at the center frequency of the high band and the back of the cabinet frame is completed by vertical side members 46 and 47 extending from member 41 and fixed to a lower frame member 48. The bottom of the frame is completed by a pair of horizontal side members 49 and 50.

Thus a complete rectangular box is formed, the corners of which are welded or otherwise fastened to achieve good electrical contact between such of the frame members as constitute the antenna structure. The bottom of the frame is provided with a conductive sheet 51 for shielding the television receiver to be enclosed by the cabinet and the rear of the frame is provided with a conductive screen 52 for preventing access to the interior of the cabinet. The sides, top and front of the cabinet are closed by non-conducting cabinet walls (not shown). An escutcheon ring 53, usually employed for decorative purposes in association with the circular face of a television picture tube, is disposed in the plane of loop section 23, 13, 14, 22 and is electrically connected to the center of conductive section 13—14. The diameter of the ring should be between one-fifth and one-third wavelength at the center frequency of the high band to minimize its effect on loop operation and yet accommodate picture tubes of various face diameters. Of course, if a rectangular escutcheon is employed the mean diameter thereof should be within the recited limits. Although sheet 51, screen 52 and escutcheon 53 may alter the field pattern of the antenna constituted by the cabinet frame, in general, the analysis presented in connection with the antenna structure of Fig. 1 is applicable and the cabinet frame antenna is substantially omnidirectional at all frequencies in each of its operating bands.

The following table gives illustrative values of significant dimensions employed in constructing satisfactory cabinet frame antennas of the type shown in Fig. 8.

*All dimensions are in wavelength at the center frequency of the high band*

| | Antenna | | | | |
|---|---|---|---|---|---|
| | #1 | #2 | #3 | #4 | #5 |
| Conductor 12–15; conductor 20–21; and conductor 13–14 | 0.4 | 0.4 | 0.6 | 0.5 | 0.5 |
| Conductor 15–22 and conductor 12–23 | 0.3 | 0.25 | 0.2 | 0.25 | .25 |
| Conductor 14–22 and conductor 13–23 | 0.3 | 0.35 | 0.2 | 0.35 | .25 |
| Stub line 26 | 0.3 | 0.3 | 0.2 | 0.25 | .25 |

Where single band operation is all that is required in a particular installation, conductor 20—21 and stub line 26 may be omitted and the loop constituted by the principal radiating conductor 12—15 may be used alone. As already explained in connection with Figs. 2–4, such a loop is essentially omnidirectional over an operating band of frequencies. This type of field pattern is produced over a frequency range of at least two-to-one approaching a "figure eight" configuration having very deep nulls or substantially no radiation along a line transverse to the line of zero antenna orientation at operating frequencies at which the effective electrical length of the loop conductor is 0.8 wavelength and 2.4 wavelengths.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A loop antenna operable over a high and a low band of frequencies spaced from one another in the frequency spectrum comprising: a first radiating conductor defining a loop having an effective electrical length substantially equal to two wavelengths at the center frequency of said high band and bent to provide two loop sections in angularly disposed, intersecting planes for operation in said high band, said conductor presenting terminal ends for connection to a feeder; a second radiating conductor connecting opposed portions of said first conductor and extending along the intersection of said planes to define with said first conductor another loop including said terminal ends for operation in said low band; and a stub line connected to said second conductor and of such electrical length as to constitute therewith at operating frequencies within said high band a high impedance compared with the portion of said first conductor shunted thereby.

2. A loop antenna operable over a high and a low band of frequencies spaced from one another in the frequency spectrum comprising: a first radiating conductor defining a loop having an effective electrical length substantially equal to two wavelengths at the center frequency of said high band and bent to provide two loop sections of substantially equal lengths in angularly disposed, intersecting planes for operation in said high band, said conductor presenting terminal ends for connection to a feeder; a second radiating conductor connecting opposed portions of said first conductor and extending along the intersection of said planes to define with said first conductor another loop including said terminal ends for operation in said low band; and a stub line connected to said second conductor and of such electrical length as to constitute therewith at operating frequencies within said high band a high impedance compared with the portion of said first conductor shunted thereby.

3. A loop antenna operable over a high and a low band of frequencies spaced from one another in the frequency spectrum comprising: a first radiating conductor defining a loop having an effective electrical length substantially equal to two wavelengths at the center frequency of said high band and bent to provide two loop sections in mutually perpendicular planes for operation in said high band, said conductor presenting terminal ends for connection to a feeder; a second radiating conductor connecting opposed portions of said first conductor and extending along the intersection of said planes to define with said first conductor another loop including said terminal ends for operation in said low band; and a stub line connected to said second conductor and of such electrical length as to constitute therewith at operating frequencies within said high band a high impedance compared with the portion of said first conductor shunted thereby.

4. A loop antenna operable over a high and a low band of frequencies spaced from one another in the frequency spectrum comprising: a first radiating conductor defining a loop having an effective electrical length substantially equal to two wavelengths at the center frequency of said high band and bent to provide two loop sections in angularly disposed, intersecting planes for operation in said high band, said conductor presenting terminal ends for connection to a feeder; a second radiating conductor connecting opposed portions of said first conductor, having a discontinuity in the central portion thereof to provide terminal portions and extending along the intersection of said planes to define with said first conductor another loop including said first-mentioned terminal ends for operation in said low band; and a stub line connected to said terminal portions of said second conductor and of such electrical length as to constitute therewith at operating frequencies within said high band a high impedance compared with the portion of said first conductor shunted thereby.

5. A loop antenna operable over a high and a low band of frequencies spaced from one another in the frequency spectrum comprising: a first radiating conductor defining a loop having an effective electrical length substantially equal to two wavelengths at the center frequency of said high band and bent to provide first and second loop sections in angularly disposed, intersecting planes for operation in said high band, said conductor presenting terminal ends in said first section for connection to a feeder; a second radiating conductor connecting opposed portions of said first conductor having a discontinuity in the central portion thereof to provide terminal portions and extending along the intersection of said planes to define with said first loop section another loop for operation in said low band; and an open-circuited stub line connected to said portions of said second conductor and of such electrical length as to constitute therewith at operating frequencies within said high band a high impedance compared with said second loop section.

6. A loop antenna operable over a high and a low band of frequencies spaced from one another in the frequency spectrum comprising: a first radiating conductor defining a loop having an effective electrical length substantially equal to two wavelengths at the center frequency of said high band and bent to provide first and second loop sections in angularly disposed, intersecting planes for operation in said high band, said conductor presenting terminal ends in said first section for connection to a feeder; a second radiating conductor connecting opposed portions of said first conductor having a discontinuity in the central portion thereof to provide terminal portions and extending along the intersection of said planes to define with said first loop section another loop for operation in said low band; and an open-circuited stub line connected to said terminal portions of said second conductor, the effective electrical length of said line plus that of said second conductor being such as to constitute at operating frequencies within said high band a high impedance compared with said second loop section and the effective electrical length of said line plus one-half that of said second conductor being smaller than three-eighths wavelength and greater than one-eighth wavelength at any frequency in said low band.

7. A loop antenna operable over a high and a low band of frequencies spaced from one another in the frequency spectrum comprising: a first radiating conductor defining a loop having an effective electrical length substantially equal to two wavelengths at the center frequency of said high band and bent to provide first and second loop sections in angularly disposed, intersecting planes for operation in said high band, said conductor presenting terminal ends in said first section for connection to a feeder; a second radiating conductor connecting opposed portions of said first conductor having a discontinuity in the central portion thereof to present terminal portions and extending along the intersection of said planes to define with said first loop section another loop for operation in said low band; and an open-circuited stub line connected to said terminal portions of said second conductor, the effective electrical length of said line plus one-half that of said second conductor being substantially equal to one-half wavelength at the center frequency of said high band to constitute at operating frequencies within said high band a high impedance compared with said second loop section.

8. A loop antenna operable over a high and a low band of frequencies spaced from one another in the frequency spectrum comprising: a first radiating conductor having an effective electrical length substantially equal to two wavelengths at the center frequency of said high band and bent to provide a loop having first and second substantially U-shaped sections in angularly disposed, intersecting planes for operation in said high band, said conductor presenting terminal ends disposed centrally in the bight portion of said first loop section for connection to a feeder; a second radiating conductor connecting opposed portions of said first conductor and extending along the intersection of said planes to define with said first loop section another loop for operation in said low band; and a stub line centrally connected to said second conductor, extending therefrom substantially in the plane of said first loop section and of such electrical length as to constitute with said second conductor at operating frequencies within said high band a high impedance compared with the portion of said first conductor shunted thereby.

9. A loop antenna operable over a high and a low band of frequencies spaced from one another in the frequency spectrum comprising: a first radiating conductor having an effective electrical length substantially equal to two wavelengths at the center frequency of said high band and bent to provide a loop having first and second substantially U-shaped sections of equal length in angularly disposed, intersecting planes for operation in said high band, said conductor presenting terminal ends disposed centrally in the bight portion of said first loop section for connection to a feeder; a second radiating conductor connecting opposed portions of said first conductor, having an effective electrical length substantially equal to one-half wavelength at the center frequency of said high band, having a discontinuity in the central portion thereof to provide terminal end portions, and extending along the intersection of said planes to define with said first loop section another loop for operation in said low band; and an open-circuited stub line connected to said portions of said second conductor, extending therefrom and having an effective electrical length substantially equal to one-quarter wavelength at the center frequency of said high band to constitute with said second conductor at operating frequencies within said high band a high impedance compared with the portion of said first conductor shunted thereby.

JOSEPH C. SPINDLER.

References Cited in the file of this patent

UNITED STATES PATENTS

| Number | Name | Date |
|---|---|---|
| 2,082,812 | Worrall | June 8, 1937 |
| 2,283,914 | Carter | May 26, 1942 |
| 2,304,446 | Eaton | Dec. 8, 1942 |
| 2,472,106 | Hansen | June 7, 1949 |
| 2,474,480 | Kearse | June 28, 1949 |
| 2,510,010 | Callaghan | May 30, 1950 |
| 2,533,529 | Spindler | Dec. 12, 1950 |